United States Patent [19]

Bachmann et al.

[11] Patent Number: 4,748,025

[45] Date of Patent: May 31, 1988

[54] NOVEL CULTURED BUTTERMILK COMPOSITIONS AND METHOD OF PREPARATION

[75] Inventors: Marc R. Bachmann, Winterthur, Switzerland; Endel Karmas, Kendall Park, N.J.

[73] Assignee: Rutgers, The State University of New Jersey, New Brunswick, N.J.

[21] Appl. No.: 832,074

[22] Filed: Feb. 24, 1986

[51] Int. Cl.$^4$ .................... A23C 9/12; A23C 17/02
[52] U.S. Cl. .................... 426/43; 426/46; 426/52; 426/61; 426/583
[58] Field of Search .................... 426/34, 42, 43, 44, 426/46, 52, 61, 583, 639, 598

[56] References Cited

U.S. PATENT DOCUMENTS

| | | | |
|---|---|---|---|
| Re. 28,276 | 12/1974 | Farr | 426/43 |
| 238,248 | 3/1981 | Peck . | |
| 1,243,855 | 10/1917 | Melhuish | 426/46 |
| 1,359,633 | 11/1920 | Thévenot | 426/655 |
| 1,767,083 | 6/1930 | Leopold . | |
| 1,982,994 | 12/1934 | Harvey | 99/11 |
| 2,311,599 | 2/1943 | Schwartz | 99/59 |
| 3,378,375 | 4/1968 | Little | 99/59 |
| 3,535,117 | 10/1970 | Yamanaka et al. | 99/59 |
| 3,625,702 | 12/1971 | Exler | 99/59 |
| 3,632,346 | 1/1972 | Sherba | 99/98 |
| 3,765,905 | 10/1973 | Kasik et al. | 99/140 R |
| 3,857,970 | 12/1974 | Tsumura et al. | 426/46 |
| 3,897,570 | 7/1975 | Yokotsuka et al. | 426/46 |
| 3,937,843 | 2/1976 | Osaka et al. | 426/46 |
| 3,982,025 | 9/1976 | Hashimoto et al. | 426/46 |
| 4,015,019 | 3/1977 | Sawada et al. | 426/46 |
| 4,066,794 | 1/1978 | Schur | 426/43 |
| 4,119,733 | 10/1978 | Hsieh et al. | 426/46 |
| 4,271,201 | 6/1981 | Stenne | 426/40 |
| 4,288,459 | 9/1981 | Baker | 426/43 |
| 4,410,549 | 10/1983 | Baker | 426/43 |
| 4,413,017 | 11/1983 | Loader | 426/616 |
| 4,416,905 | 11/1983 | Lundstedt et al. | 426/34 |
| 4,432,999 | 2/1984 | Bily | 426/583 |
| 4,459,313 | 7/1984 | Swanson et al. | 426/39 |
| 4,483,874 | 11/1984 | Olsen | 426/44 |

FOREIGN PATENT DOCUMENTS 1154139 6/1969 United Kingdom .

OTHER PUBLICATIONS

Schroder et al., "Prep. of Soybean Cheese Using Lactic Starter Organisms", JFS 36:24 (1971).
Journal of Japan Food Industry Assoc., vol. 17, No. 10, pp. 456–461 (1970).
Studies on Utilization of Soybean Protein for Food Manuf., Yamanaka et al, JFS 17:11 (1970).
Chen, Nutrition & Proc. of Soymilk, Dec. 2, 1980, Bangkok, Thailand.
Kosikowski, "Cheese & Fermented Milk Foods", 2nd ed., 1982, pp. 37–67.

Primary Examiner—Raymond N. Jones
Assistant Examiner—Marianne M. Cintins
Attorney, Agent, or Firm—Leroy G. Sinn

[57] ABSTRACT

Novel cultured buttermilk compositions made by fermentation of a fermentation mixture comprising about 15 percent to about 70 percent fresh cowmilk, ewemilk or other suitable fresh milk and about 85 percent to about 30 percent soymilk using buttermilk fermentation organisms are provided. Use of a sweetener and a thickener is unnecessary to provide a cultured buttermilk composition having a good acceptability and like or substantially indistinguishable from that of a corresponding cultured buttermilk composition made from the fresh milk used in making the cultured buttermilk compositions. Flavoring agents and fruit preparations suitable as additives in preparation of cultured buttermilk compositions can be added in conventional manner. The provided compositions have an enhanced Protein Efficiency Ratio value of about 2.5 and a reduced animal fat content as compared to the corresponding compositions using 100 percent fresh milk. Also provided are methods of preparation of the novel cultured buttermilk compositions.

17 Claims, 1 Drawing Sheet

United States Patent Office

PTO - BOYERS, PA Duty Station

MISSING PAGE TEMPORARY NOTICE

PATENT # 4748025    FOR ISSUE DATE 5-31-1988

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 1

Data Conversion Operation
Boyers, Pa

NOVEL CULTURED BUTTERMILK COMPOSITIONS AND METHOD OF PREPARATION

DESCRIPTION

1. Technical Field

This invention relates to a novel cultured buttermilk composition made by fermentation using buttermilk fermentation organisms in a fermentation medium comprising a combination of soymilk and fresh cowmilk, ewemilk or other suitable milk. It also relates to a method of preparation of a cultured buttermilk composition using soymilk and cowmilk, ewemilk or other suitable milk.

2. Background Art

Cultured buttermilk is a milk product normally made using fresh whole milk, partially skimmed milk or skim milk. The milk is cultured using a suitable culturing organism for making buttermilk which produces lactic acid during the fermentation. The milk ingredient is initially pasteurized, preferably using a high temperature to rid the milk of pathogenic and other unwanted organisms. Pasteurized milk is then cooled to 20° C. to 30° C., placed into a closed buttermilk fermentation system and is inoculated using one or more buttermilk-producing organisms. The fermentation is carried out until sufficient acid is produced and a desired low pH is obtained, at which point the milk has coagulated to provide desirably a curd of firm consistency. When the fermentation mixture has reached the desired acidity and consistency, it is agitated to break up the curd to provide the desired fluidity in the final buttermilk. The agitation is carried out while the composition is cooled to about 10° C. or lower desired temperature. The bacterial growth and metabolism are essentially arrested by the cooling of the buttermilk composition. This cooling also essentially causes lactic acid production to be stopped.

Fruit and flavoring agents are often added to the buttermilk compositions to suit particular tastes.

Cultured buttermilk is a healthful form of dairy product. Cultured buttermilk contains an active culture and when it is consumed, some of the organisms from it pass unharmed through the stomach. These organisms thrive in an acid medium and are not completely destroyed by the gastric juices. When the cultured buttermilk organisms pass into the intestinal area, they may cause a favorable floral implantation. Cultured buttermilk has beneficial nutritional value such as desirable vitamin and protein contents and other nutrient values. It has a thirst quenching property. It is used in cooking a variety of dishes. It is an important food which is nutritious and relatively inexpensive.

Often the ingestion of cultured buttermilk is beneficial to patients who are required to take large oral doses of antibiotics or other compounds which interfere with the floral activity and contents of the intestine. For those people who have malabsorption of lactose or an intolerance for lactose, cultured buttermilk has an advantage over the starting milk used in its manufacture in that it has lower lactose content. Also, the beta-galactosidase provided by the buttermilk culture bacteria replaces to an extent the lacking or insufficient amount of beta-galactosidase in such people.

In many parts of the world there is a shortage of fresh milk, whether the shortage be local in character or whether it be widespread throughout a large region, such as in one or more countries. Also, a shortage of fresh milk can be seasonal. For example, during a part of the year in some areas of the world, there is adequate rainfall to provide animals with sufficient food so they produce milk in reasonable quantities. However, at other times of the year, shortage of rain can cause the quantity of vegetation for milk-producing animals to be reduced greatly so that the quantity of milk produced by the animals is greatly reduced. Therefore, it is important to be able to extend the quantity of milk so that the nutritious value of fresh milk can be extended and thereby provide some of the valuable nutrients to the human diet.

It has been known that a very good source of protein is the soybean. The soybean is available in a great many parts of the world. The soy protein is both relatively low in cost and has very good nutritional character. However, the soybean food forms such as soymilk can produce so-called "beany flavor", which is undesirable to the taste of man. Also, soybean foods can produce in the form of soymilk or other forms a high degree of flatulence. It is therefore important that there be a method of extending the milk supply and to provide an acceptable form of protein from soybeans, which would provide a greatly needed source of milk as well as protein from soybeams.

Soymilk has been used in the past alone or in combination with other ingredients to make milk-like liquid compositions, which had certain deficiencies.

It would be highly advantageous to provide cultured buttermilk which permits use of a small content of fresh milk and a high content of soymilk, which cultured buttermilk would have a highly acceptable taste and consistency without requirement to use sweeteners, thickening agents and certain other additives, greatly extend limited supplies of fresh milk, and provide a highly acceptable form of protein (soy protein) and relatively low animal fat and lactose contents as desired.

SUMMARY OF THE INVENTION

By this invention is provided novel cultured buttermilk compositions. They are made by culturing a combination of a high content of soymilk together with an amount of fresh cowmilk, ewemilk or other suitable fresh milk. It has been found, for example, that if the content of the fermentation mixture used is at least about 15 percent of fresh cowmilk, ewemilk or other suitable fresh milk, a flavor of the cultured buttermilk can be provided by this invention which has good acceptability and is like or substantially indistinguisable from that of a corresponding cultured buttermilk using 100 percent of the same fresh milk. The soymilk content of the combination of fresh milk and soymilk can vary from about 85 percent to about 30 percent.

It has also been found that the taste of the novel cultured buttermilk compositions is like or substantially indistinguishable from the corresponding cultured buttermilk made with fresh milk. The cultured buttermilk can be made using fresh cowmilk or ewemilk in the form of whole milk, partially skimmed milk, or skim milk. It often is desirable to have the fat content of the buttermilk reduced in order to result in less animal fat intake on the part of the consumer. By using such method of producing buttermilk, it is possible to provide a highly nutritious buttermilk having a high protein content, but at the same time having a low animal fat content. The protein contributed by the soymilk has a composition very similar to that of milk protein.

Another advantage of the buttermilk compositions provided hereby, as compared to a corresponding buttermilk composition made from fresh milk, is their lower lactose contents for those consumers who have malabsorption of lactose or an intolerance for lactose. Additionally the buttermilk culture bacteria of the buttermilk compositions at the same time provide beta-galactosidase to the intestional area, which is lacking or in insufficient supply in lactose malabsorbing or lactose intolerant people.

The cultured buttermilk compositions of this invention provide important nutrients for the well-being of consumers.

The invention also relates to a method of preparation of such low animal fat, high protein content cultured buttermilk compositions whereby soymilk is utilized to benefit from its unique protein character, which can be provided at low cost and which is available in large and widely prevalent supply. This method permits extension of the supply of fresh milk. The process enables important contribution to the nutrition of peoples in various parts of the world.

DETAILED DESCRIPTION OF THE INVENTION

In making the cultured buttermilk compositions of this invention, it is preferred to use fresh cowmilk or ewemilk. However, other suitable fresh milk can be employed. For example, goat milk, buffalo milk, and others can be used. It is suitable to utilize from 15 to 70 percent of fresh cowmilk in the compositions. Correspondingly, about 30 to about 85 percent soymilk is used. The economic considerations and the best extension of the available supply of fresh milk encourage the use of the greater percentages of soymilk. Preferred compositions are made from a pasteurized fermentation mixture of fresh cowmilk, ewemilk or other suitable fresh milk, the quantity of fresh milk used is from about 15 percent up to less than 50 percent, with a further preferred quantity of fresh milk being from about 15 percent to about 30 percent, with the remainder of the composition comprising soymilk. The milk used can be partially skimmed milk or skim milk and often the use thereof is preferable.

The cultured buttermilk compositions provided by this invention and the methods of preparation of this invention have a curd of firm consistency, especially when there is absence in the composition of a substantial amount of additives, such as fruit and flavoring agents, etc. Therefore, when unflavored or natural cultured buttermilk is made, it is not necessary to use thickening agents or gelling agents. Also, it is not necessary when making such natural cultured buttermilk compositions to add sweetening agents. The cultured buttermilk compositions of this invention do not require added sweetening agents in the same manner that corresponding cultured buttermilk compositions made using 100 percent pasteurized fresh cowmilk or other fresh milk do not require added sweetening agents.

Suitable soymilk can be provided for use in making the cultured buttermilk compositions by soaking good quality whole soybeans in water for an appropriate time. A period of 12-18 hours is adequate. Soaking is suitably carried out at room temperature, for example, at a temperature of 20° to 25° C. The water:soybean ratio can vary. However, a ratio of about 3 parts by weight of water to one part by weight of soybeans is suitable. The ratio can be increased or decreased somewhat with satisfactory results. The soaking water then is removed and is discarded. The soaked beans are washed. The water used can be a good quality tap water. If desired, distilled water can be used, but ordinarily it is not necessary to use distilled water for the washing step. The water used for washing the soybeans is discarded. The washed soybeans are then desirably blanched such as for 10-25 minutes, suitably for about 15 minutes at an elevated temperature such as 90° C. to 95° C. The water:soybean ratio used for blanching can vary, but a ratio of from 7:1 to 8:1 is suitable. Upon completion of the blanching step the water:soybean mixture is milled using a suitable instrument such as a Waring Blendor to form an aqueous soybean puree. The solid portion of the puree is removed suitably by centrifugation. Following the above procedure as designated a suitable soymilk is obtained having a soy protein content of 3.1 to 3.6 percent.

The fat content of the soymilk composition can be reduced as desired following techniques known to the art. Also, the lipid content of the soymilk composition can also be modified or reduced by known techniques such as by treatment with selected enzymes. As desired, such treatments can be employed to enhance flavor and other desirable properties.

The cultured buttermilk compositions of this invention are made by making the desired fermentation mixture by blending the desired amount of soymilk with the desired percentage of fresh cowmilk, ewemilk or other suitable fresh milk. The ingredients of the fermentation mixture are then pasteurized at high temperature, typically in the range of 80° C. to about 110° C., preferably at about 85° C. to 90° C., at which heat the pasteurization process is at times carried out under high pressure. Pasteurization is carried out so long as necessary to kill the undesired organisms. Care should be exercised not to heat the mixture longer than necessary. Deleterious effects can result. It has been found that maintaining the mixture at 90° C. for a minute or less, such as about 15 seconds, is generally adequate. In some cases, somewhat longer time might be necessary.

The pasteurized mixture then is cooled in one or more stages to a temperature in the range of about 20° C. to about 27° C., preferably at about 22° C. to about 25° C.; and then it is inoculated with buttermilk producing cultures. Certain known buttermilk cultures are satisfactory for use in this method. It is desirable to use a combination of cultures to produce acceptable end cultured buttermilk compositions coming within this invention. The fermentation or culturing is continued for an appropriate time until the cultured buttermilk composition reaches a pH in the range of about 4.7 to about 4.3, a pH of about 4.5 generally being suitable for providing a final product having optimal properties. At this time the consistency of the cultured buttermilk curd is "firm" as the term is understood in the cultured buttermilk art. Appropriate time for the fermentation is generally about 7 to about 20 hours. Longer times can be used but generally speaking are unnecessary and on occasion certain longer times can result in undesirable properties. About 8 to about 10 hours of fermentation is often a sufficient fermentation time depending on the fermentation culture, fermentation temperature, amount of added fermentation culture and other factors, and therefore would, if sufficient, be a preferred fermentation time.

The culture used is a combination of mesophilic bacteria capable of producing the cultured buttermilk of this invention. A suitable combination of organisms has been found to be a combination of *Streptococcus cremoris, Streptococcus lactis* and *Leuconostoc citrovorum* in about a 1:1:1 ratio. Although it has been found that the organisms function well in the cultured buttermilk process in substantially equal amounts, some variation from this ratio can be made so long as the desired cultured buttermilk compositions of this invention are made. Substitutions of other organisms in the culture can be made so long as the desired cultured buttermilk compositions of this invention are produced. Streptococcus diacetylactis organism may be added to the fermentation mixture if desired for purposes of flavor enhancement.

The above mesophilic buttermilk producing cultures can be obtained from commercial sources in a dried, stable form, which are suitable for addition to the pasteurized cultured buttermilk fermentation combination without contaminating the fermentation mixture or otherwise detracting from the desired quality of the final cultured buttermilk composition.

It has been found that addition of small amounts of citric acid, for example up to about 0.5% of citric acid, results in enhancement of the flavor of the final cultured buttermilk compositions.

The equipment used in carrying out the method of preparation of the cultured buttermilk compositions of this invention can be that conventionally used by those skilled in the cultured buttermilk art, either commercially or utilized by consumers themselves. The equipment utilized will permit the culturing or fermentation process to be carried out without comtamination and with suitable control of fermentation temperatures. The fermentation is conventionally carried out in a sealed fermentation vessel equipped with an agitator. The inner surface of the vessel is desirably stainless steel or glass. Good sanitation is essential. Otherwise, contamination as with Escherichia-Aerobactor bacteria can occur. Contamination of the buttermilk product results in undesired reactions such as formation of carbon dioxide bubbles and other undesired contaminants.

The fermentation should be continued ordinarily until the acid content of the fermentation mixture is at least about 0.75 percent expressed as lactic acid; ordinarily optimum acid content expressed as lactic acid is between about 0.75 to about 0.80 percent. Acid content should not exceed 0.85 percent. At above 0.85 percent acid content, the usual sharpness of such cultured buttermilk product can be offset at least to some degree by addition of some salt, such as 0.1 percent and not more than 0.2 percent.

When proper acidity and curd formation is attained, the fermentation mixture is desirably agitated at a suitably moderate rate to break the curd so as to cause the cultured buttermilk to become a fluid and drinkable liquid. During the agitation the fermentation mixture is desirably cooled to about 10° C. or slightly below. At such temperature, the metabolism of the fermentation organism is slowed so that essentially no further acid production occurs. The final cultured buttermilk should have a medium-bodied viscosity, which falls between a thick-bodied viscosity (flows from a container with difficulty) and thin-bodied viscosity (flows from a container too readily such as does the starting milk itself).

The liquid cultured buttermilk composition then can be filled into individual containers as by passing the composition in an aseptic manner into a filling machine suitable for filling individual containers with the cultured buttermilk product. Care should be used in transferring to the filling machine in order to avoid bubble formation in the product.

The filling is carried out using customarily employed good practices to avoid contamination. The containers can be conventional paper containers, such as found on food store shelves, or other suitable containers.

Undesired release of liquid held by the protein components of the cultured buttermilk composition, also called "wheying-off", can be minimized or essentially avoided by proper control of acidity, using proper pasteurization techniques, avoiding excess agitation in breaking the curd, by use of a proper low storage temperature and other suitable practices known to those in the cultured buttermilk art.

If proper components are used in making the cultured buttermilk and suitable acid content and agitation is employed, "wheying-off" is minimized. Wheying-off is more prevalent if the agitation to break the curd is carried out when the curd is too low in viscosity.

Excessive acidity at the time of breaking the curd is a main cause of excessive fluidity in the final cultured buttermilk product and should be avoided. Presence of undesired organisms which digest portions of the fermentation mixture can also cause undesired excessive fluidity in the final cultured buttermilk.

The fluidity or consistency of the final agitated cultured buttermilk product is measured with a penetrometer. A beaker containg 200 ml of the buttermilk is used for testing. A penetrometer having a weave surface is weighted with a 30-gram weight. The time is measured at which penetration of 2.5 cm is attained. The weave surface is illustrated as shown in FIG. 1.

The thickening point of a cultured buttermilk composition can be determined as that time at which a glass rod is necessary to remove the cultured buttermilk from a test tube, i.e., the buttermilk is not pourable from the test tube. A stabilizing agent may be added as desired in a quantity. The stabilizing agent can be used to offset any separation during storage of whey from the cultured buttermilk composition, which action is called in the art syneresis. The amount of stabilizing agent should be kept to a minimum effective amount. Stabilizer agents acceptable to the cultured buttermilk art can be used. A suitable agent for such stabilization or dispersion is non-fat dry milk solids. Such dry milk solids can be added in a quantity as desired from about 0.1 to about 10 percent, desirably from about 0.3 to about 7 percent, and preferably from about 1 to about 5 percent by weight based on the total cultured buttermilk composition weight. The non-fat dry milk solids which can be used is available commercially in powdered form and is preferably of the type that is readily dissolved in water. For this purpose, there may be employed dried skim milk solids which has been dehydrated to form a concentrated liquid, then subjected to a second spray drying step so as to aerate the milk powder, thereby rendering it quickly soluble.

Flavoring agents may be incorporated into cultured buttermilk compositions as desired. They can be added to the cultured buttermilk after agitated or, if desired, to the pasteurized fermentation mixture. The flavoring agent may be natural or artificial, and it is desirable to use one which imparts to the cultured buttermilk composition a fruit flavor, such as strawberry, blueberry, peach, cherry, lemon, mango, banana, kiwi, coconut and the like. Other flavors such as tomato, peanut butter, chocolate, and the like can also be used. It might also be desirable to add such flavors as vanilla and other flavors which are customarily used in the dairy product flavoring art.

In addition, natural fruits can be added to the cultured buttermilk after the curd has been broken by agitation in minced form or as a puree. A Waring Blendor, for example, can be used to serve the purpose of comminuting the fruits for addtion. Also, certain commercial fruit preparations made for addition to milk products including cultured milk products can be used. It has been found that a number of commercial firms have such fruit preparations which are suitable for this addition. It has been found that if a particular cultured buttermilk product coming within the above defined soymilk-fresh milk combinations has a slight undesired flavor, addition of such fruit or flavor preparation renders its taste acceptable or within the intent of this invention. Such fruit additions can be selected from strawberry, blueberry, banana, kiwi, mango, pineapple, lemon, coconut, peach, orange, apple and other preparations. The addition of a small amount of citric acid to the fermentation mixture has been found useful in preserving the color of cultured buttermilk to which a fruit preparation has been added. An amount of about 0.15 to about 0.20 percent has been found suitable. The amount can be varied as desired and depending upon the particular composition employed. It will be suggested to those of the cultured buttermilk art to use other acceptable color preservatives. The addition of citric acid to the fermentation mixture often provides a benefit to the final flavor of the cultured buttermilk product, depending in part on the organisms of the fermentation culture used.

When a flavoring agent is employed, it may be required or desirable to use a sweetening agent to offset the taste of the added component. Conventional sweetening agents can be used for the purpose, such as sucrose, fructose, and synthetic agents, such as saccharin, aspartame and others. At times the preferred sweetening agent is fructose, or combinations of fructose and sucrose or other agents.

The amount of flavoring agent used may vary widely depending upon the flavoring agent used and specific taste, but generally an amount from about 0.1 to about 5, typically from about 0.3 to about 3.0, and preferably from about 0.5 to about 1.0 percent by weight based upon the total composition on a dry weight basis, is used.

Coloring agents may also be used in the preparation of the cultured buttermilk compositions of this invention. A coloring agent may be any acceptable coloring ingredient appropriate to the flavoring agent. Thus, in the case of strawberry flavor, an appropriate accepted or approved red coloring agent can be used. The amount of coloring agent may vary widely, but an amount generally from about 0.001 to about 1.0, typically from about 0.02 to about 0.5, and preferably from about 0.06 to about 0.1 percent by weight of the total cultured buttermilk composition may be used based on dry weight of the cultured buttermilk composition.

It is at times desired to add to the cultured buttermilk compositions an amount of thickening agent to offset the influence of such added fruits or flavoring agents. Conventional thickening agents can be used in the normally required amounts to retain the desired firm consistency of the final cultured buttermilk compositions.

A thickening agent is preferably water soluble and one that is approved for use in such food preparations as cultured buttermilk. The thickening agent employed should also not detract from the flavor of the cultured buttermilk composition. An amount of such thickening agent is added which will provide the desired thickening. Generally, the amount of the thickening agent used does not exceed about 0.5 to about 1 percent, depending upon the cultured buttermilk composition, the additives to the cultured buttermilk composition, and the particular thickening or stabilizing agent employed. Such stabilizing or thickening agents include plant exudates (e.g., gum arabic), seaweed extracts (e.g., alginates), plant and seed gums (e.g., guar gum) and plant extracts (e.g, pectin). These commercial stabilizers are soluble in water or milk and therefore may be incorporated at the beginning of the fermentation process or at later stages as desired. Also, certain pectin derivatives can be used such as methoxy pectins. The quantity of stabilizers should not detract from the firm consistency of the cultured buttermilk composition and should not detract from the texture of the cultured buttermilk as it appears to the eye or to the touch of the mouth, referred to as "mouth appeal."

The cultured buttermilk compositions of this invention provide Protein Efficiency Ratio (PER) value of about 2.5. The PER value of soymilk protein alone is less than 2.4. Therefore, the cultured buttermilk compositions of this invention, having a PER of about 2.5, are complete as compared with reference PER-value of casein, which is 2.5. An important consideration of the cultured buttermilk compositions of this invention is that with the use of a small amount of fresh cowmilk, ewemilk or other suitable fresh milk, a cultured buttermilk composition is provided which has a high PER value.

The pH of the fermentation or culture mixture during the course of the preparation can be determined in conventional manner using a suitable pH instrument.

The amount of lactic acid produced which contributes largely to the increase in acidity as desired is measured following a conventional titration method using, for example, a known Sochlet-Henkel method. The designation °SH is used to refer to the lactic acid present in the cultured buttermilk composition which is equivalent to the milliliters of 0.25N NaOH used to titrate 100 milliliters of cultured buttermilk composition, using phenolphthalein as the indicator and following a conventional titration procedure.

The following examples are for the purpose of illustration and are not intended to be limiting.

EXAMPLE I

Whole soybeans are soaked in water overnight (about 16 hours) at room temperature (20°-25° C.) using tap water:soybean weight ratio of 3:1. The water is discarded. The soybeans are rinsed with tap water. The soaked soybeans are blanched at 90°-95° C. for 15 minutes using water: soybean weight ratio of about 7.5:1. The aqueous soybean mixture is then formed into a puree using a Waring Blendor. The resulting puree is centrifuged to separate the soymilk from the solid matter. The solid material is discarded. The soymilk has 3.1-3.6 percent by weight soy protein content.

The soymilk is added to 10-30 parts by volume of fresh cowmilk to make 100 parts of the mixture. An amount of 0.5 percent citric acid is added, which amount can be increased to about 2.0 percent if a fruit flavoring preparation is added. The mixture is then pasteurized at about 90° C. for 15 seconds and then cooled to the fermentation temperature.

The pasteurized mixture is then transferred aseptically to a fermentation vessel suited for cultured buttermilk production. The fermentation vessel is equipped to maintain the fermentation temperature and to cool the fermentation mixture after the desired pH level, acidity and curd hardness are attained.

The cooled, pasteurized mixture is then inoculated with a buttermilk producing culture having 1:1:1 ratio of *Streptococcus cremoris*, *Streptococcus lactis* and *Leuconostoc citrovorum*. The culture is added by distributing it in a small volume of the pasteurized mixture, which is then added to the pasteurized mixture and thoroughly mixed therein by moderate agitation. The incubation is carried out at about 25° C. In approximately 6 hours thickening commonly occurs. The fermentation is carried out for 8.5–9.0 hours as shown in the following table or until suitable thickening or firm curd formation, acidity and pH (about 4.5) are reached. The pH and °SH values are obtained using the fermentation mixtures listed in the following Table:

TABLE

| Comp. No. | Composition (% by vol.) Soymilk | Cowmilk | pH | °SH | Fermentation Time (hrs) |
|---|---|---|---|---|---|
| 1 | 100 | 0 | 5.17 | 19.0 | 9.0 |
| 2 | 90 | 10 | 4.57 | 23.0 | 8.5 |
| 3 | 80 | 20 | 4.56 | 27.0 | 8.5 |
| 4 | 75 | 25 | 4.57 | 28.0 | 8.5 |
| 5 | 70 | 30 | 4.56 | 28.0 | 9.0 |
| 6 | 0 | 100 | 4.68 | 38.0 | 9.0 |

After the fermentation mixture has fermented to the point that the desired acid content, pH and curd hardness have been attained, the formed curd is broken by moderate agitation with cooling to form a fluid and drinkable cultured buttermilk composition. The composition is cooled to 5° C. If desired, flavors can be added as desired, it not added to the fermentation mixture at an earlier stage of the procedure. If some optimization of the flavor is desired, flavoring such as a fruit flavoring preparation can be added to render the composition like or substantially indistinguishable from a corresponding cultured buttermilk made from fresh milk.

The cultured buttermilk compositions have firm consistency and have a flavor like or substantially indistinguishable from that of a corresponding cultured buttermilk composition using 100 percent of fresh cowmilk.

EXAMPLE 2

The procedure of Example 1 is repeated using a fermentation temperature of about 22° C. and 15–70 parts of fresh cow milk.

EXAMPLE 3

The procedures of Examples 1 and 2 are repeated using lowfat (1.5 percent butterfat) cowmilk instead of whole cowmilk.

EXAMPLE 4

The procedures of Examples 1 and 2 are repeated using skim milk instead of whole cowmilk.

EXAMPLE 5

The procedures of Examples 1 and 2 are repeated using ewemilk instead of cowmilk.

EXAMPLE 6

The procedures of Examples 1–5 are repeated using the following fruit or flavoring agents: tomato, peanut butter, chocolate or vanilla flavoring agents; or strawberry, blueberry, raspberry, peach, orange, lemon, banana, kiwi, apple, coconut, or cherry cultured buttermilk fruit flavoring preparations.

What is claimed is:

1. A cultured buttermilk composition comprising a fermented, pasteurized mixture of about 30 to about 85 percent soymilk, about 15 to about 70 percent fresh milk and a buttermilk producing culture, said cultured buttermilk having a firm curd consistency, which can be broken to render said cultured buttermilk pourable and drinkable, and a flavor like or substantially indistinguishable from a cultured buttermilk made by a fermentation using 100 percent pasteurized fresh milk.

2. A cultured buttermilk composition according to claim 1 wherein the mixture has about 50 to about 85 percent soymilk and about 15 up to less than 50 percent fresh milk.

3. A cultured buttermilk composition according to claim 1 wherein the mixture has about 75 to about 85 percent soymilk and about 15 to about 25 percent fresh milk.

4. A cultured buttermilk composition according to claim 1 wherein the fresh milk used is fresh cowmilk.

5. A cultured buttermilk composition according to claim 2 wherein the fresh milk used is fresh cowmilk.

6. A cultured buttermilk composition according to claim 3 wherein the fresh milk used is fresh cowmilk.

7. A cultured buttermilk composition according to claim 1 which further comprises a fruit or flavoring agent.

8. A cultured buttermilk composition according to claim 2 which further comprises a fruit or flavoring agent.

9. A cultured buttermilk composition according to claim 3 which further comprises a fruit or flavoring agent.

10. A cultured buttermilk composition according to claim 4 which further comprises a fruit or flavoring agent.

11. A cultured buttermilk composition according to claim 5 which further comprises a fruit or flavoring agent.

12. A cultured buttermilk composition according to claim 6 which further comprises a fruit or flavoring agent.

13. A method for preparation of a cultured buttermilk composition having a firm curd consistency comprising inoculating a pasteurized mixture of about 30 to about 85 percent soymilk and about 15 to about 70 percent fresh milk, with a buttermilk-producing mesophilic culture comprised of a combination of *Streptococcus cremoris*, *Steptococcus lactis* and *Leuconostoc citrovorum* to obtain a fermentation mixture, maintaining said fermentation mixture at a fermentation temperature of from about 20° C. to about 27° C. until a pH of about 4.3 to about 4.7 and firm curd are obtained and breaking the curd by agitation to form a fluid and drinkable cultured buttermilk composition.

14. A process of claim 13 wherein the inoculating culture comprises about equal parts of *Streptococcus cremoris*, *Streptococcus lactis* and *Leuconostoc citrovorum*.

15. A process of claim 14 wherein the fresh milk used is cowmilk.

16. A process of claim 14 wherein the pH of the cultured buttermilk composition is about 4.5.

17. A process of claim 14 wherein the amount of fresh milk is about 15 to about 50 percent, and the pH of the cultured buttermilk composition is about 4.5.

* * * * *